Patented Sept. 29, 1931

1,825,256

UNITED STATES PATENT OFFICE

MERL R. WOLFARD, OF CAMBRIDGE, AND AVERY A. MORTON AND RICHARD H. HUSSEY, OF WATERTOWN, MASSACHUSETTS

LUBRICANT FOR HOT SURFACES

No Drawing.     Application filed January 16, 1929. Serial No. 333,022.

This invention relates to improvements in lubricants for hot surfaces.

The principal object of the invention is to provide a lubricant for a hot surface sufficiently resistant to the heat of said surface, or to the heat to which the surface is subjected, that a friction-reducing film of said lubricant may be maintained upon said surface.

Another object of the invention is to provide a lubricant for the wall of a combustion chamber of such character that a film of said lubricant may be applied to and maintained upon said wall which will preclude intimate adhesion of carbon residue to said wall.

More specifically the object of the invention is to provide a lubricant of the character above specified which can be maintained in the form of a surface film upon walls of the combustion chamber of an internal combustion engine and the relatively movable mechanisms associated therewith, and which will effectively reduce usual friction losses, and will also substantially preclude intimate adhesion of carbon residue to said wall or walls.

A further object of the invention is to provide a lubricant of the character above specified containing in solution a substantial percentage of saturated molecules resistant to decomposition by the heat to which it is exposed and of sufficient fluidity to enable it to be applied to and to form upon said surface a protective film.

A further object of the invention is to provide a lubricant for the walls of the combustion chambers of an internal combustion engine and the relatively movable mechanisms associated therewith, containing a substantial percentage of saturated molecules which are resistant to decomposition by the heat produced in said combustion chamber in solution and disseminated throughout a carrying vehicle capable of atomization, thereby enabling the lubricant to be applied to the heated walls in the form of a surface film either by an atomized spray projected directly upon the wall, or by introduction in atomized form in the explosive mixture supplied to the combustion chamber.

A further object of the invention is to provide a lubricant of the character specified containing a substantial percentage of saturated fatty acid which may be in a free state or in combination.

The term "saturated fatty acid" is used herein as descriptive of fatty acids in which there are present in the molecule as many hydrogen atoms as possibly can be joined to the carbon atoms and, therefore, resistant to decomposition by heat at the maximum temperatures ordinarily attained at and by the surfaces of the combustion chamber walls and associated parts of internal combustion engines.

A further object of the invention is to provide a lubricant of the character specified in solution with camphor, or a substance of similar characteristics, which aids materially in bringing fats into solution and also aids in preventing deposition of carbon upon the surfaces of the walls of the combustion chambers and the relatively movable mechanisms associated with the combustion chamber.

These and other objects and features of the invention will more fully appear from the following description and will be particularly pointed out in the claims.

It is well known that carbon is deposited not only upon the walls of the combustion chambers of an internal combustion engine, but is also deposited upon and clings to the valves, valve stems, valve stem guides, and other moving parts associated with the combusion chamber. This clinging carbon often causes sticking of the valves and other parts and produces an intermittent action of the engine, and even if such parts do not stick the friction caused by this carbon deposit may very materially reduce the efficiency of the engine.

Furthermore, when carbon accumulates upon the walls of the combustion chamber of an internal combustion engine it will so retain the heat of combustion, that, where the engine is working under heavy load, premature ignition of the explosive mixture will be caused during compression, thereby producing a so-called "knock" and greatly reducing the power of the engine.

The present invention contemplates the provision of a lubricant with which such surfaces may be moistened to form and maintain a protective film which will prevent intimate adhesion of carbon upon such surfaces. By the present invention this is accomplished irrespective of the manner in which the carbon is formed, whether by incomplete combustion of the flammable mixture introduced into the combustion chamber, or by decomposition of the fluid medium which carries the effective lubricant, or otherwise.

The invention in its broad sense comprises an oleaginous solution containing a compound having a high percentage of saturated molecules sufficiently resistant to decomposition by the heat to which it is exposed to produce a surface film which will preclude adhesion of carbon to said surface.

Preferably the lubricant for the walls of the combustion chamber of an internal combustion engine embodying the invention comprises an oleaginous solution containing a compound having a high percentage of saturated fatty acid disseminated throughout a carrying vehicle of a fluidity capable of atomization and which under the pressure produced in the combustion chamber will be condensed upon the walls thereof. We have found that saturated fatty acid, either in a free state or in combination in such a solution is sufficiently resistant to decomposition by the heat within the combustion chamber as to produce and maintain a surface film upon the walls of the chamber and upon the relatively moving parts associated therewith.

The carrying vehicle desirably is a lubricating oil diluted to the desired fluidity by benzene or other suitable solvent for fats.

We have found by experiment that a relatively wide range of oils, fats, greases or waxes containing a high percentage, for example over fifty per cent, of saturated fatty acids are very satisfactory. Among the most efficient of these are cocoanut oil, cacao butter and palm kernel oil, which contain a high percentage of stearic, palmitic, myristic, lauric, and other saturated fatty acids. These as well as saturated fatty acids alone, such as stearic acid, may be employed.

It is well understood that unsaturated fatty acids and their glycerides may be hydrogenated; therefore, certain of the oils, fats and greases containing fatty acids which have been properly hydrogenated may be employed. These include certain hydrogenated vegetable oils, fish oils, and tallows. Mixtures of fats or greases having the desired content of saturated molecules may also be employed.

Such natural or hydrogenated oils, fats, or greases containing a high percentage of saturated fatty acids are dissolved in a suitable solvent, such as benzene, and the solution is preferably disseminated throughout a carrying vehicle, preferably a lubricating oil having a low boiling point. Kerosene may be used as a solvent and a carrying vehicle where a high degree of lubrication is not required.

Desirably camphor is incorporated into the solution as it is found that camphor when so introduced greatly increases the solubility of the fat in the mixture, and also aids in preventing intimate adhesion of carbon to the hot surface or surfaces.

The carrier for the oils, fats or greases containing a high percentage of saturated fatty acid should be of a fluidity capable of such fine atomization that the lubricant may not only be sprayed directly upon the hot surface or walls of the combustion chamber, but also may be sprayed into the explosive mixture during its introduction into the chamber, so that the lubricant will moisten the walls of the combustion chamber and the relatively movable parts associated therewith, and will form a thin protective film thereupon acting both to prevent intimate adhesion of the carbon residue thereupon and to lubricate said walls and associated parts. It is well known that when gases, either hot or cold, are subjected to compression, the higher boiling constituents thereof separate first; consequently, when the lubricant above described is introduced into the chamber in atomized form, or either directly or mixed with the vapors of the gasoline, or other fuel, the fatty acids or their glycerides will be deposited upon the walls of the combustion chamber and form thereupon the thin protective film above described.

It has been found by repeated tests that the lubricant embodying the present invention, as herein described, is so resistant to volatilization and decomposition by heat that a very small quantity, such for example as four ounces of lubricant will maintain a lubricating and protective film upon the walls of the combustion chamber, the valves, valve stems, valve stem guides, etc., of an internal combustion engine of an ordinary automobile over a running distance of one hundred miles.

Typical lubricants which have been eminently successful comprise the following formulæ in substantially the proportions specified:—

(1)

| | | |
|---|---|---|
| Cocoanut oil | 6 | ounces or five to ten per cent |
| Benzene | 32 | ounces or ten to twenty per cent |
| Camphor | 6 | ounces or four to eight per cent |
| Lubricating oil | 29.7 Baumé | 84 ounces or remaining per cent to equal one hundred per cent. |

(2)

| | | |
|---|---|---|
| Stearic acid | 6 | ounces or five to ten per cent |
| Benzene | 32 | ounces or ten to twenty per cent |
| Camphor | 6 | ounces or four to eight per cent |
| Lubricating oil | 29.7 Baumé | 84 ounces or remaining per cent to equal one hundred per cent. |

(3)

| | | |
|---|---|---|
| Cacao butter | 4 | ounces or three per cent |
| Benzene | 34 | ounces or twenty-five per cent |
| Camphor | 6 | ounces or five per cent |
| Lubricating oil 29.7 Baumé | 84 | ounces or sixty-seven per cent. |

It will be understood that the proportions of the ingredients may be varied in accordance with the character or quality of the materials used as will be obvious to those skilled in the art.

It has been found by numerous and repeated tests of different makes of automobile engines that where a lubricant embodying the invention disclosed herein is employed, the combustion chamber walls, valves, valve stems, valve stem guides, etc., will remain for indefinite periods of time without substantial deposit of carbon upon them; that the surfaces when examined will be found to be in a moist condition; that greater power is produced by the engine, and that the quantity of gasoline consumed per mile is reduced as compared with the usual operation of the engine without said lubricant.

It is further found that where the lubricant embodying the present invention is applied to the wall upon which a carbon residue has already been deposited, the film of lubricant will gradually work itself beneath the adhering carbon, thereby loosening, and to a great extent detaching, the same.

Thus by the present invention "knocking" of the engine is eliminated, and greater power and higher efficiency produced and the expense of frequent cleaning and regrinding of valves is also eliminated.

The invention is not only useful in its application to internal combustion engines, but may be used effectively upon any hot surface which is exposed to the action of combustion; for example, in many heating devices vapors of oils or gases are burned in a combustion chamber and the heat produced thereby conducted by the walls of the chamber to a suitable gaseous or liquid heat transporting medium such as steam or water. By the use of the lubricant embodying the present invention deposition upon the walls of the combustion chamber of carbon residue, produced by incomplete combustion of the flammable material, is substantially obviated and the walls of the combustion chamber kept clean. By thus avoiding accumulation of carbon, which is a poor conductor of heat, upon the walls of the combustion chamber the efficiency of the apparatus is greatly increased.

Other uses of the lubricant embodying the present invention will be obvious to those skilled in the art.

We are aware that tetra ethyl lead, and other substances, have been added to gasoline used in internal combustion engines for the purpose of preventing "knocking", but such materials act upon the explosive mixture and are ineffective to prevent accumulation of carbon in the engine, and when carbon does accumulate are ineffective to prevent "knocking".

It is believed that the method of moistening the wall or walls of the combustion chamber and associated parts by introducing said lubricant in atomized form and condensing, by the pressure in the combustion chamber, upon said wall or walls a surface film of oleaginous material containing in solution a compound having a high percentage of saturated molecules sufficiently resistant to decomposition by heat to which it is exposed to preclude intimate adhesion of carbon residue to said surface which will act to prevent "knocking" and at the same time maintain the wall in a satisfactory state of lubrication, is entirely novel.

It is further believed that the method of lubricating the walls of a combustion chamber of an internal combustion engine which comprises introducing into the cylinder with the explosive mixture supplied thereto a relatively small amount of a solution in atomized form containing, either in a free state or in combination, a saturated fatty acid sufficiently resistant to decomposition by the heat to which it is exposed to provide and maintain upon the walls of the cylinder a surface film which will preclude intimate adhesion of carbon residue to said walls, is also novel.

It will be understood that the specific materials and proportions of the same disclosed herein as composing the lubricant embodying the invention are illustrative of those which may be employed to produce the required characteristic lubricant as broadly defined herein and are, therefore, not restrictive of the meaning and scope of the following claims.

Having thus described the invention, what is claimed as new, and desired to be secured by Letters Patent, is:

1. A lubricant for the combustion chamber of an internal combustion engine comprising from two to ten per cent of a fat which contains a high percentage of saturated fatty acid in solution with oil of a fluidity capable of atomization at ordinary atmospheric temperatures by the suction of the engine.

2. A lubricant for the combustion chamber of an internal combustion engine comprising an oil containing a volatile solvent holding in solution from two to ten per cent of a fat which contains a high percentage of saturated fatty acid and two to eight per cent of camphor disseminated throughout oil of a fluidity capable of atomization at ordinary atmospheric temperatures by the suction of the engine.

3. A lubricant for the combustion chamber of an internal combustion engine comprising from two to ten per cent of a fat which contains a high percentage of saturated fatty acid in solution with benzene and lubricating oil mixed in proper proportions to permit fine atomization at ordinary temperatures by the suction of the engine.

4. A lubricant for the combustion chamber of an internal combustion engine comprising from two to ten per cent of a fat which contains a high percentage of saturated fatty acid and two to eight per cent of camphor in solution with benzene and lubricating oil mixed in proper proportions to permit fine atomization at ordinary temperatures by the suction of the engine.

5. The method of lubricating the walls of the combustion chamber of an internal combustion engine which consists in depositing in atomized form upon said walls a surface film containing a compound having a high percentage of saturated fatty acid sufficiently resistant to decomposition by the heat and pressure of confined combustion to which it is exposed to preclude intimate adhesion of carbon to said surface.

6. The method of lubricating the walls of a combustion chamber of an internal combustion engine which consists in depositing in atomized form upon said walls a surface film containing a substantial percentage of saturated fatty acid sufficiently resistant to decomposition by the heat and pressure of confined combustion to which it is exposed to preclude intimate adhesion of carbon residue to said surfaces.

7. The method of lubricating the walls of a combustion chamber of an internal combustion engine which consists in depositing in atomized form upon said walls a surface film containing a compound having a high percentage of saturated fatty acid sufficiently resistant to decomposition by the heat to which it is subjected, in sufficient quantity to maintain said surface continuously moist and thereby to preclude intimate adhesion of carbon residue to said surface.

8. The method of lubricating the walls of the combustion chamber of an internal combustion engine which comprises introducing into said chamber with the explosive mixture supplied thereto a relatively small amount of oleaginous solution containing a compound having a high percentage of saturated fatty acid in solution and in atomized form and sufficiently resistant to decomposition by the heat to which it is exposed to maintain continuously a surface film upon the walls of said cylinder which will preclude intimate adhesion of carbon residue to the walls of said combustion chamber and the parts associated therewith.

In testimony whereof, we have signed our names to this specification.

MERL R. WOLFARD.
AVERY A. MORTON.
RICHARD H. HUSSEY.